ବ୍ୟ2,948,763
Patented Aug. 9, 1960

2,948,763
ALKYLATION OF AROMATIC COMPOUNDS

Richard D. Ashmore, Texas City, Tex., assignor to Monsanto Chemical Company, St. Louis, Mo., a corporation of Delaware No Drawing. Filed June 17, 1954, Ser. No. 437,589

10 Claims. (Cl. 260—671)

The present invention concerns an improved process for carrying out the alkylation of aromatic compounds with olefins in the presence of a Friedel-Crafts catalyst. More particularly, it relates to a novel procedural step in the formation of the organo-metal halide complex catalyst for use in such reactions.

The alkylation of aromatic hydrocarbons with olefins using an aluminum halide catalyst, such as anhydrous aluminum chloride, has been known for some time. It is also well understood that the active catalytic agent in such reactions is not the metallic halide itself but rather is a complex organo-metal halide substance commonly referred to as "catalyst complex." In the customary procedure for carrying out alkylation reactions, the solid metal halide is suspended in the aromatic compound or a solution thereof and the alkylating agent is then gradually introduced into the suspension. In such a process, the solid metal halide slowly reacts to form a partially soluble organo-metal halide complex catalyst and this material then promotes the desired reaction.

The above method suffers from the disadvantage that the concentration and activity of the actual catalyst are not constant but change as long as a solid metal halide continues to form catalyst complex and hence the activity can never be precisely controlled. In addition, there are difficulties and hazards attendant on the use and handling of anhydrous aluminum halides, particularly aluminum chloride, which are neither easily nor readily overcome. These metallic halides are so highly hydroscopic that they are difficult to store, hence they must often be freshly prepared or freshly sublimed. This, of course, constitutes considerable additional expense in a process using these materials. Also, the presence in the reaction mixture of unreacted solid metal halides during the early stages of the reaction before the catalyst complex is completely formed tends to induce the polymerization of the olefin with consequent formation of tarry materials which markedly decrease the efficiency of the alkylation reaction. Because of the relatively high activity of the metallic halides commonly employed, such as aluminum chloride, it is extremely desirable, therefore, to use only the minimum amount of catalyst which is necessary to effect the desired reaction. In some cases, too, where the halide is suspended in the aromatic reactant, there is a residual amount of unreacted finely divided aluminum halide which forms an undesirable sediment often clogging up the reactor and its accessory parts. Because of these and other disadvantages, the processes of the prior art are not completely satisfactory.

To avoid some of these difficulties, it has previously been proposed to form the aluminum halide catalyst "in situ" by adding metallic aluminum and anhydrous hydrogen halide rather than aluminum halide with the feed to the alkylator. This method, however, has the serious disadvantage of reducing some of the aromatics present to saturated compounds which are then carried through subsequent steps for processing the alkylate as inert materials which seriously affect the efficiency of the overall system.

It is an object of the invention, therefore, to overcome the deficiencies of the prior art and to provide an improved process for the alkylation of aromatic hydrocarbons with olefins in the presence of an aluminum halide catalyst.

It is a further object of the invention to provide a new and improved process for effecting the alkylation of aromatics with olefins in the presence of an aluminum chloride-hydrocarbon complex catalyst.

Another object of the invention is to provide a novel and improved method for producing the aluminum chloride-hydrocarbon complex catalyst for use in the alkylation of aromatic compounds. Other objects and advantages will become apparent from the following description of the invention and the appended claims.

According to the invention, there is provided a method for producing alkylated aromatic hydrocarbons which comprises the steps of reacting aluminum with anhydrous hydrogen halide in a hydrocarbon medium, separating the aluminum halide thus formed from the hydrocarbon medium as a slurry, reacting this slurry with an aromatic hydrocarbon and an olefin to form an organo-metal halide complex, and feeding said complex as a catalyst to an alkylator along with an aromatic hydrocarbon, an olefin, and a promoter under conditions for alkylating the aromatic hydrocarbon with the olefin.

The following example is presented to illustrate the invention but it is not to be construed as limiting it in any manner.

Example

A three-liter, round-bottomed flask equipped with a stirrer, thermometer, cold water condenser, and a bottom drain through which gas could be fed was employed as the reactor for preparing catalyst complex. A gas line was attached to the upper end of the condenser and this led through a gas surge bottle and two water-filled gas scrubbing bottles in parallel. The scrubbing bottles were in turn connected to a wet-test meter for measuring the volume of gas evolved.

The reactor was charged with 1000 ml. (880 g.) of benzene (C.P. grade) and 57 g. of 30-40 mesh aluminum metal. The mixture was heated to a temperature of 55° C. and then anhydrous HCl was fed at the rate of 0.04 mole/min. initially but the feed rate was reduced to 0.025 mole/min. as the heat of reaction raised the temperature to around 75° C. The off-gas from the reaction was scrubbed and metered. Unreacted HCl was determined by titration of the scrubbers which were changed approximately every fifteen minutes. The reaction was discontinued after about 2.5 hr. when the absorption of HCl had fallen off markedly and it was evident that substantially all of the aluminum had been reacted.

The benzene was drained off and 1000 ml. of fresh benzene was added to the reaction slurry. The mixture was preheated to 55° C. and 8 moles of ethylene together with small amounts of HCl to promote the reaction was introduced at a rate low enough to maintain the reaction temperature between 55° and 70° C., i.e., at about 0.02 mole per minute. Approximately 1014.3 g. of product catalyst complex were produced having an aluminum chloride content of 27.38%. This represents 277.2 g. of AlCl$_3$, equivalent to 56.24 g. of aluminum and hence an aluminum recovery of 98.6%. By analysis the organic portion of the complex (736.6 g.) contained 45.3% benzene, 24.9% ethylbenzene and 29.8% polyethylbenzenes. In the supernatant organic layer (431.2 g.) there was found 57.2% benzene, 40.6% ethylbenzene and 2.2% polyethylbenzenes. Benzene recovery therefore, was 95.4% while ethylene recovery was 95.5%.

In order to determine the activity of the catalyst complex produced as described above, it was employed as the catalytic agent in the alkylation of benzene with ethylene to produce ethylbenzene. Six successive alkylation experiments were performed in a laboratory alkylator consisting of a two-liter, round-bottomed flask equipped with inlet and outlet gas lines extending to the bottom of the vessel and fitted with glass frits, stirring and heating means, a thermometer, and a cold water condenser. An off-gas scrubber containing water or caustic was connected on the one hand to the condenser on the alkylator and on the other hand to a wet-test gas meter. Flowrators were employed for measuring the ethylene and HCl feeds. The catalyst complex was charged to the reactor and heated to 80° C. with stirring. The organic feed was preheated to 80° C. and then introduced into the reactor. The organic feed in all cases consisted of 230 ml. of benzene, 150 ml. of ethylbenzene, and 40 ml. of polyethylbenzene. Ethylene was then introduced at a rate of 0.02 mole per minute along with small amounts of HCl as a promoter over a period of 20 minutes during which time the temperature of the reaction mixture was controlled at 80° C. by a glass heating mantle. At the end of the 20-minute reaction period, the reaction mixture was drained slowly from the alkylator via a bottom drain and through a water-cooled condenser into a large separatory funnel. After settling, the lower catalyst complex phase was drained into a graduated cylinder and its volume recorded. This recovered catalyst complex was then used in the next experiment. The alkylated liquor layer was measured, washed three times with water, dried with CaCl$_2$, and fractionally distilled to recover benzene, ethylbenzene and residue (polyethylbenzenes).

Analyses of the alkylates in weight percent are tabulated below:

Table I

| Run No. | 1 | 2 | 3 | 4 | 5 | 6 |
|---|---|---|---|---|---|---|
| Benzene | 46.8 | 41.4 | 42.2 | 43.2 | 42.9 | 42.7 |
| Ethylbenzene (EB) | 44.0 | 39.6 | 45.3 | 45.7 | 44.3 | 44.3 |
| Polyethylbenzene (PEB) | 9.2 | 19.0 | 12.5 | 11.1 | 12.8 | 13.0 |
| Ratio, EB/PEB | 4.90 | 2.05 | 3.75 | 4.15 | 3.70 | 3.40 |
| Average Ratio | 3.66 | | | | | |

The ratio EB/PEB is taken as a measure of alkylation catalyst activity in this system: the higher the ratio, the more active the catalyst.

The values in Table II below were obtained in six alkylations by the conventional method of suspending solid aluminum chloride in benzene and introducing ethylene and small amounts of hydrochloric acid as a promoter into the suspension. The resultant catalyst complex was then used in alkylations under the same conditions as above. The alkylates were then analyzed.

Table II

| Run No. | 1 | 2 | 3 | 4 | 5 | 6 |
|---|---|---|---|---|---|---|
| Benzene | [1]43.4 | 44.0 | 44.2 | 44.4 | 44.7 | 44.5 |
| Ethylbenzene (EB) | 43.7 | 43.0 | 42.1 | 42.6 | 42.7 | 42.6 |
| Polyethylbenzene (PEB) | 13.0 | 13.0 | 13.6 | 13.0 | 12.6 | 13.0 |
| Ratio, EB/PEB | 3.36 | 3.30 | 3.10 | 3.28 | 3.38 | 3.28 |
| Average Ratio | 3.28 | | | | | |

[1] All values are in weight percent.

It is obvious from a comparison of the results obtained in these series of experiments that better ratios of monoethylbenzene, the desired alkylation product, to polyethylbenzene are produced by the process of the invention and that the catalyst complex thus made is a very active material.

The process of the invention is not restricted to the exact procedure set forth in the example given. Substantial variations may be made in the process without departing from the scope of the invention. In the step for reacting aluminum and hydrochloric acid, for example, the hydrochloric acid feed rate may vary from 0.02 mole per minute to 0.08 mole per minute. In general, the reaction rate is doubled as the feed is quadrupled. However, at the higher feed rate levels, absorption of HCl decreases by almost one-half. An optimum feed rate, therefore, appears to be around 0.03–0.05 mole per minute.

Any form of aluminum metal may be employed but those forms exhibiting fairly large surface areas such as metal turnings, granulated metal, etc., should be used. Granulated metal of from 5–100 mesh is particularly suitable and, since at a constant feed rate and temperature, HCl absorption is somewhat dependent upon particle size, a particle size of 20–50 mesh is preferable. The reaction may be carried out at any temperature in the range from 50–80° C. but preferably from about 65° to about 75° C.

Aluminum and hydrogen chloride may be reacted in a hydrocarbon medium other than benzene. Compounds chosen from the group consisting of benzene, saturated acyclic and alicyclic hydrocarbons containing from 5 to 8 carbon atoms are generally satisfactory as hydrocarbon media. Representative of such compounds are pentane, hexane, cyclopentane, cyclohexane, heptane and octanes, all of which are eminently suitable as media for the aluminum-hydrogen halide reaction.

While the example is directed to the employment of hydrogen chloride, other hydrogen halides such as hydrogen bromide may, of course, be considered equivalent.

Some variations may likewise be made in the step for preparation of the catalyst complex. Benzene and ethylene are generally employed in such proportions by weight that their combined quantities represent about 75% of the weight of the finished catalyst complex. Weight ratios of from about two to about four parts benzene and ethylene combined per part of the aluminum chloride slurry may be used, with a ratio of three parts of benzene and ethylene per part of aluminum chloride being preferred. The preferred ethylene to benzene weight ratio in manufacturing catalyst complex is 1 : 1. However, very active catalyst complex may be made with ethylene-benzene ratios ranging from about 0.7:1 to about 1.4:1. The amount of hydrogen halide promoter ordinarily employed in relation to ethylene varies in the ratio from 1:1000 to 1:10. The preferred ratio of promoter to ethylene is 1:100.

Catalyst complex formation may be effected at any point within the temperature range from 25–90° C. but preferably is controlled at about 55° to about 75° C. The reaction is usually carried out at atmospheric pressure but may be carried out as well as lower or higher pressures.

Considerable latitude may be exercised in the choice of conditions for the alkylation reaction proper without departing from the scope of the invention. The alkylation reaction is carried out in any type of suitable reactor either in a continuous or batch-wise fashion. The apparatus and technique employed in the process have been adequately described in the alkalation art and do not form a part of this invention. Generally, the reaction is effected by introducing the preformed complex, benzene, hydrogen chloride, and the ethylene alkylating agent into the reaction zone maintained at a temperature in the range from about 80 to about 150° C. Reaction temperatures in the range from about 70 to about 90° C. are preferred when the reaction is conducted under the usual atmospheric pressure.

The alkylation reaction may be carried out at superatmospheric pressures ranging from 80–300 p.s.i.g. if desired and at these pressures, the higher temperatures prevail.

Usually, from 1 to 2.5 parts by weight of catalyst complex are charged per part of benzene, but preferably the catalyst complex-benzene ratio is kept at approximately 2:1. A suitable benzene-ethylene weight ratio lies in the range from about 4:1 to about 7:1 and preferably a ratio of 6:1 is employed.

The amount of hydrogen halide ordinarily employed as a promoter may vary from a minimum of one part by weight per thousand parts of ethylene to one part for every 10 parts of ethylene. Most beneficial results are obtained with an HCl/ethylene ratio of 1:100.

The process of the present invention, while it is particularly adapted to the production of ethylbenzene from benzene and ethylene, is not limited to this reaction but has general applicability in the production of alkylated aromatic hydrocarbons. Suitable aromatic compounds, for example, in addition to benzene useful in the invention include hydrocarbons such as ethylbenzene, diethylbenzene, toluene, xylene, and the like. These compounds may likewise be alkylated with olefins other than ethylene such as propylene, butylene, isobutylene and even some higher olefins such as propylene tetramer, for example, by the process herein described.

What is claimed is:

1. An improved process for producing alkylated aromatic hydrocarbons which comprises forming an organo-metal halide complex catalyst by reacting aluminum with an anhydrous hydrogen halide in a hydrocarbon medium, separating the aluminum halide formed from the hydrocarbon medium as a slurry, reacting said slurry with an aromatic hydrocarbon and an olefin, and introducing the preformed complex catalyst thus produced into an alkylator with an alkylatable aromatic hydrocarbon and an olefin under conditions for alkylating said aromatic hydrocarbon with said olefin.

2. An improved process for producing alkylated aromatic hydrocarbons which comprises forming an organo-metal halide complex catalyst by reacting aluminum with an anhydrous hydrogen halide in a hydrocarbon chosen from the group consisting of benzene, saturated acyclic hydrocarbons containing from 5 to 8 carbon atoms and alicyclic hydrocarbons containing from 5 to 8 carbon atoms, separating the aluminum halide formed from the hydrocarbon medium as a slurry, reacting said slurry with an aromatic hydrocarbon and an olefin, and introducing the preformed complex catalyst thus produced into an alkylator with an alkylatable aromatic hydrocarbon and an olefin under conditions for alkylating said aromatic hydrocarbon with said olefin.

3. An improved process for producing alkylated aromatic hydrocarbons which comprises forming an organo-metal halide complex catalyst by reacting granulated aluminum of from about 5 to about 100 mesh with an anhydrous hydrogen halide in a hydrocarbon chosen from the group consisting of benzene, saturated acyclic hydrocarbons containing from 5 to 8 carbon atoms and alicyclic hydrocarbons containing from 5 to 8 carbon atoms, separating the aluminum halide formed from the hydrocarbon medium as a slurry, reacting said slurry with an aromatic hydrocarbon and an olefin, and introducing the preformed complex catalyst thus produced into an alkylator with an alkylatable aromatic hydrocarbon and an olefin under conditions for alkylating said aromatic hydrocarbon with said olefin.

4. An improved process for producing alkylated aromatic hydrocarbons which comprises forming an organo-metal halide complex catalyst by reacting granulated aluminum of from about 5 to about 100 mesh with an anhydrous hydrogen halide at a temperature from about 50° to about 80° C. in a hydrocarbon chosen from the group consisting of benzene, saturated acylic hydrocarbons containing from 5 to 8 carbon atoms and alicyclic hydrocarbons containing from 5 to 8 carbon atoms, separating the aluminum halide formed from the hydrocarbon medium as a slurry, reacting said slurry with an aromatic hydrocarbon and an olefin, and introducing the preformed complex catalyst thus produced into an alkylator with an alkylatable aromatic hydrocarbon and an olefin under conditions for alkylating said aromatic hydrocarbon with said olefin.

5. An improved process for producing alkylated aromatic hydrocarbons which comprises forming an organo-metal halide complex catalyst by reacting granulated aluminum of from about 5 to about 100 mesh with an anhydrous hydrogen halide at a temperature from about 50° to about 80° C. in a hydrocarbon chosen from the group consisting of benzene, saturated acyclic hydrocarbons containing from 5 to 8 carbon atoms and alicyclic hydrocarbons containing from 5 to 8 carbon atoms, separating the aluminum halide formed from the hydrocarbon medium as a slurry, reacting said slurry with an aromatic hydrocarbon and an olefin at a temperature from about 25° C. to about 90° C., and introducing the preformed complex catalyst thus produced into an alkylator with an alkylatable aromatic hydrocarbon and an olefin under conditions for alkylating said aromatic hydrocarbon with said olefin.

6. An improved process for producing alkylated aromatic hydrocarbons which comprises forming an organo-metal halide complex catalyst by reacting granulated aluminum of from about 5 to about 100 mesh with an anhydrous hydrogen halide at a temperature from about 50° to about 80° C. in a hydrocarbon chosen from the group consisting of benzene, saturated acyclic hydrocarbons containing from 5 to 8 carbon atoms and alicyclic hydrocarbons containing from 5 to 8 carbon atoms, separating the aluminum halide formed from the hydrocarbon medium as a slurry, reacting said slurry with an aromatic hydrocarbon and an olefin at a temperature from about 25° C. to about 90° C. in such proportions that from about two to about four parts by weight of the aromatic hydrocarbon and olefin combined are present for every part of the aluminum halide slurry, and introducing the preformed complex catalyst thus produced into an alkylator with an alkylatable aromatic hydrocarbon and an olefin under conditions for alkylating said aromatic hydrocarbon with said olefin.

7. An improved process for producing alkylated aromatic hydrocarbons which comprises forming an organo-metal halide complex catalyst by reacting granulated aluminum of from about 5 to about 100 mesh with an anhydrous hydrogen halide at a temperature from about 50° to about 80° C. in a hydrocarbon chosen from the group consisting of benzene, saturated acyclic hydrocarbons containing from 5 to 8 carbon atoms and alicyclic hydrocarbons containing from 5 to 8 carbon atoms, separating the aluminum halide formed from the hydrocarbon medium as a slurry, reacting said slurry with an aromatic hydrocarbon and an olefin at a temperature from about 25° to about 90° C. in such proportions that from about two to about four parts by weight of the aromatic hydrocarbon and olefin combined are present for every part of the aluminum halide slurry and the weight ratio of aromatic hydrocarbon to olefin is approximately 1:1, and introducing the preformed complex catalyst thus produced into an alkylator with an alkylatable aromatic hydrocarbon and an olefin under conditions for alkylating said aromatic hydrocarbon with said olefin.

8. An improved process for producing ethylbenzene which comprises forming an organo-metal chloride complex catalyst by reacting granulated aluminum of from about 5 to about 100 mesh with anhydrous hydrogen chloride at a temperature from about 50 to about 80° C. in a hydrocarbon chosen from the group consisting of benzene, saturated acyclic hydrocarbons containing from 5 to 8 carbon atoms and alicyclic hydrocarbons containing from 5 to 8 carbon atoms, separating the aluminum chloride formed from the hydrocarbon medium as a slurry, reacting said slurry with benzene and ethylene at a temperature from about 25° to about 90° C. in such proportions that from about two to about four parts by weight of benzene and ethylene combined are present for every part of the aluminum chloride slurry, and introducing the preformed complex catalyst thus produced into an alkylator with benzene and ethylene under conditions for alkylating said benzene with said ethylene.

9. An improved process for producing ethylbenzene which comprises forming an organo-metal chloride complex catalyst by reacting granulated aluminum of from about 5 to about 100 mesh with anhydrous hydrogen chloride at a temperature from about 50 to about 80° C. in a hydrocarbon chosen from the group consisting of benzene, saturated acyclic hydrocarbons containing from 5 to 8 carbon atoms and alicyclic hydrocarbons containing from 5 to 8 carbon atoms, separating the aluminum chloride formed from the hydrocarbon medium as a slurry, reacting said slurry with benzene and ethylene at a temperature from about 25° to about 90° C. in such proportions that from about two to about four parts by weight of benzene and ethylene combined are present for every part of the aluminum chloride slurry and the weight ratio of benzene to ethylene is approximately 1:1, and introducing the preformed catalyst thus produced into an alkylator with benzene and ethylene under conditions for alkylating said benzene with said ethylene.

10. An improved process for producing ethylbenzene which comprises forming an organo-metal chloride complex catalyst by reacting granulated aluminum of from about 5 to about 100 mesh with anhydrous hydrogen chloride at a temperature from about 50° to about 80° C. in benzene, separating the aluminum chloride formed from the benzene as a slurry, reacting said slurry with benzene and ethylene at a temperature from about 55° to about 75° C. and in such proportions that three parts by weight of benzene and ethylene combined are employed per part of aluminum chloride slurry and the weight ratio of ethylene to benzene is 1:1, and introducing the preformed complex catalyst thus produced into an alkylator with benzene and ethylene under conditions for alkylating said benzene with said ethylene.

References Cited in the file of this patent

UNITED STATES PATENTS

| | | |
|---|---|---|
| 2,057,432 | Ipatieff et al. | Oct. 13, 1936 |
| 2,078,238 | Dreisbach | Apr. 27, 1937 |
| 2,222,012 | Amos et al. | Nov. 19, 1940 |
| 2,270,292 | Gross | Jan. 20, 1942 |
| 2,388,428 | Mavity | Nov. 6, 1945 |
| 2,541,882 | Moore | Feb. 13, 1951 |

OTHER REFERENCES

Thomas: Anhydrous Aluminum Chloride in Organic Chemistry, page 847, (1941), published by Reinhold Publishing Corp., New York, New York.